(12) United States Patent
Yomo et al.

(10) Patent No.: US 8,705,492 B2
(45) Date of Patent: Apr. 22, 2014

(54) MIMO RECEIVING APPARATUS AND RECEIVING METHOD

(75) Inventors: Hidekuni Yomo, Osaka (JP); Kiyotaka Kobayashi, Leuven (BE)

(73) Assignee: Panasonic Corporation, Osaka (JP)

( * ) Notice: Subject to any disclaimer, the term of this patent is extended or adjusted under 35 U.S.C. 154(b) by 171 days.

(21) Appl. No.: 13/386,112

(22) PCT Filed: Jun. 6, 2011

(86) PCT No.: PCT/JP2011/003173
§ 371 (c)(1),
(2), (4) Date: Jan. 20, 2012

(87) PCT Pub. No.: WO2011/155172
PCT Pub. Date: Dec. 15, 2011

(65) Prior Publication Data
US 2012/0127889 A1  May 24, 2012

(30) Foreign Application Priority Data

Jun. 8, 2010  (JP) .................................. 2010-131186

(51) Int. Cl.
*H04L 1/06* (2006.01)
*H04W 16/28* (2009.01)
(52) U.S. Cl.
USPC ........... 370/334; 370/241; 370/335; 375/267; 375/147; 455/121
(58) Field of Classification Search
USPC .......................... 375/254–263, 267; 455/121; 370/328–338
See application file for complete search history.

(56) References Cited

U.S. PATENT DOCUMENTS

2002/0191535 A1   12/2002   Sugiyama et al.

FOREIGN PATENT DOCUMENTS

| JP | 2002-176361 A | 6/2002 |
| JP | 2003-124907 A | 4/2003 |
| JP | 2003-234718 A | 8/2003 |
| JP | 2007-215037 A | 8/2007 |
| WO | 2006/013858 A1 | 2/2006 |

OTHER PUBLICATIONS

International Search Report for PCT/JP2011/003173 dated Jul. 5, 2011.
Satoshi Kurosaki, et al., "A SDM-COFDM Scheme Employing a Simple Feed-Forward Inter-Channel Interference Canceller for MIMO Based Broadband Wireless LANs", IEICE Trans. Commun, vol. E86-B. No. 1, Jan. 2003.

*Primary Examiner* — Andrew Chriss
*Assistant Examiner* — John Lequang
(74) *Attorney, Agent, or Firm* — Pearne & Gordon LLP

(57) ABSTRACT

A MIMO receiving apparatus that can demodulate a spatially multiplexed signal without using any division operation requiring a large quantity of operation resources. In the MIMO receiving apparatus, stream separation section (105) separates a spatially multiplexed signal into a plurality of streams based on numerator submatrix A. Numerator submatrix A is determined according to channel matrix H and a canceller scheme and corresponds to a numerator of stream separation matrix S that equalizes the phase and amplitude of the spatially multiplexed signal. Denominator part calculation section (108) calculates a denominator (denominator coefficient) of stream separation matrix S and correction section (117) corrects a threshold determined according to a modulation scheme of the spatially multiplexed signal using the denominator (denominator coefficient) of stream separation matrix S. Demapping sections (109-1 to 109-3) calculate likelihoods of the plurality of streams through a threshold decision using the corrected threshold.

7 Claims, 9 Drawing Sheets

MIMO RECEIVING APPARATUS AND RECEIVING METHOD

TECHNICAL FIELD

The present invention relates to a MIMO (Multi Input Multi Output) receiving apparatus and receiving method.

BACKGROUND ART

In recent years, a MIMO scheme is actively being used as a method for effectively utilizing limited radio frequency resources. According to a transmission scheme using the MIMO scheme, the transmitting side and receiving side simultaneously and spatially multiplex and transmit a plurality of synchronized radio streams using a plurality of antennas. Therefore, the transmission scheme using the MIMO scheme can improve the frequency utilization efficiency compared to a case where single signals are transmitted, depending on situations of radio transmission channels.

According to the MIMO scheme, the receiving side can also separate a plurality of spatially combined streams by performing signal processing using a plurality of antennas (see Patent Literature 1). However, depending on the situations of radio transmission channels, influences of cross interference among streams are so large that the transmission error rate may deteriorate.

To reduce these influences, the MIMO scheme generally employs a method of performing error correction using soft decision values after demapping. This method multiplies streams after MIMO separation by a coefficient proportional to signal-to-noise power of the separated streams or the square root thereof or the like. This makes it possible to maintain original reception amplitude information, maximize the performance of a soft decision error correcting decoder and suppress influences of cross interference among streams.

Furthermore, the MIMO scheme provides a method of acquiring a coefficient proportional to signal-to-noise power of streams after the above-described MIMO separation using parameters obtained in the process of calculating an inverse matrix of transfer factors without the need for separately providing envelope generation (see Patent Literature 2).

Furthermore, Non-Patent Literature 1 describes details of this calculation. This calculation will be described briefly below. When channel characteristic H between N transmitting antennas and N receiving antennas is expressed as shown in equation 1, inverse matrix G of channel characteristic H is expressed as shown in equation 2.

(Equation 1)

$$H = \begin{pmatrix} h_{11} & h_{21} & \cdots & h_{N1} \\ h_{12} & h_{22} & \cdots & h_{N2} \\ \vdots & \vdots & \ddots & \vdots \\ h_{1N} & h_{2N} & \cdots & h_{NN} \end{pmatrix} \quad [1]$$

(Equation 2)

$$G = (H)^{-1} \quad [2]$$
$$= \frac{1}{|H|} {}^t[(-1)^{i+j}|H_{ij}|]$$
$$= \begin{pmatrix} g_{11} & g_{21} & \cdots & g_{N1} \\ g_{21} & g_{22} & \cdots & g_{N2} \\ \vdots & \vdots & \ddots & \vdots \\ g_{1N} & g_{2N} & \cdots & g_{NN} \end{pmatrix}$$

where, $|H_{ij}|$ represents a minor determinant of $h_{ij}$ and t represents a transpose matrix.

A spatially multiplexed signal is separated into a plurality of streams using a feedforward type inter-channel interference canceller (linear interference canceller) of a ZF (Zero Forcing) criterion or MMSE (Minimum Mean Square Error) criterion or the like. An n-th stream after the stream separation is multiplied by weighting factor $w_n$ (see equation 3).

(Equation 3)

$$w_n = \frac{1}{\sqrt{\sum_{l=1}^{N} |g_{ln}|^2}} \quad [3]$$

FIG. 1 is a block diagram of a receiving apparatus that performs the above-described processing. In FIG. 1, each stream MIMO-separated through a matrix calculation is subjected to demapping for linear modulation such as QAM (Quadrature Amplitude Modulation). Since the amplitude and phase are equalized through the matrix calculation, the demapping section can make a decision based on a threshold set on the x-axis or y-axis on a phase space diagram. By calculating the distance from the threshold for each bit, an approximate likelihood is calculated.

FIG. 2 is an example where a constellation for 16QAM is shown on a phase space diagram. For example, of signal points corresponding to a bit stream of four bits of (b0, b1, b2, b3), the probability that the b1 bit may be 1 is high at signal points located in the shaded area in the figure and the probability that the b1 bit may be 0 is high at signal points located outside the shaded area. Therefore, when the x coordinate of a signal point to be decided is +, the distance from threshold +2 is calculated as a likelihood of the b1 bit and when the x coordinate of a signal point to be decided is −, the distance from threshold −2 is calculated as a likelihood of the b1 bit. Thus, when the modulation scheme is 16QAM, likelihoods are calculated for the four bits respectively.

Furthermore, when bit-by-bit interleaving is applied on the transmitting side, a demapping section converts a likelihood for each stream from parallel to serial and outputs the converted likelihood. A multiplication section multiplies the likelihood outputted from the demapping section by weighting factor $w_n$ and the likelihood after the multiplication is rearranged by a deinterleaver. When convolutional coding is performed on the transmitting side, a soft decision Viterbi circuit performs error correction on the likelihood after the rearrangement and obtains a decoded word. The decoded word is outputted to a MAC (Media Access Control) section that performs protocol processing.

Thus, according to the above-described prior art, an inverse matrix operation section and a weighting factor calculation section perform a division operation (see equation 2 and equation 3).

When a frame made up of a preamble part and a data part as in the case of IEEE802.11n is used, the MIMO receiving apparatus performs channel estimation using the preamble part transmitted at the start of the frame and obtains a channel matrix. The MIMO receiving apparatus then adopts a configuration of calculating an inverse matrix of the channel matrix obtained (transfer factor inverse matrix in Patent Literature 2), temporarily saving the inverse matrix and repeatedly using the saved inverse matrix in the data part transmitted after the preamble part. That is, a general MIMO receiving apparatus performs a division operation necessary to calculate an inverse matrix only during processing of the preamble part.

Furthermore, the MIMO receiving apparatus adopts a CSMA/CA (Carrier Sense Multiple Access/Collision Avoidance) scheme. The MIMO receiving apparatus that adopts the CSMA/CA scheme must send back an Ack (ACKnowledgement) signal to transmit the fact that the reception has been successful to the transmitting side within a defined time. Therefore, the MIMO receiving apparatus needs to finish the processing of the preamble part as quickly as possible. Thus, the division operation for inverse matrix calculation needs to be processed at high speed though it is performed only once per frame.

CITATION LIST

Patent Literature

PLT 1
Japanese Patent Application Laid-Open No. 2003-124907
PLT 2
Japanese Patent Application Laid-Open No. 2003-234718

Non-Patent Literature

NPL 1
"A SDM-COFDM Scheme Employing a Simple Feed-Forward Inter-Channel Interference Canceller for MIMO Based Broadband Wireless LANs", Satoshi KUROSAKI et al., IEICE TRANS. COMMUN., VOL. E86-B, No. 1 January 2003

SUMMARY OF INVENTION

Technical Problem

However, the division operation requires a larger quantity of operation resources than multiplication or the like of the same bit width. As a result, the division operation may lead to an increase in circuit scale, require a longer time for operation, resulting in a problem of interfering with the realization of downsizing and power saving.

It is an object of the present invention to provide a MIMO receiving apparatus and receiving method capable of demodulating a spatially multiplexed signal without using any division operation requiring a large quantity of operation resources.

Solution to Problem

A MIMO receiving apparatus according to the present invention adopts a configuration including: a plurality of receiving antennas that receive spatially multiplexed signals transmitted from a plurality of transmitting antennas, an estimation section that estimates a channel matrix between the plurality of transmitting antennas and the plurality of receiving antennas, a separation section that separates the spatially multiplexed signal into a plurality of streams based on a submatrix corresponding to a numerator of a stream separation matrix that is determined by the channel matrix and an interference canceller scheme and equalizes a phase and amplitude of the spatially multiplexed signal, a calculation section that calculates a denominator of the stream separation matrix, a correction section that corrects a threshold determined according to a modulation scheme of the spatially multiplexed signal using the denominator of the stream separation matrix, a demapping section that calculates likelihoods of the plurality of streams through a threshold decision using the corrected threshold, a weighting factor deriving section that determines a weighting factor proportional to respective signal-to-noise power ratios of the plurality of streams and a weighting section that weights the likelihoods using the weighting factor.

A receiving method of the present invention is a receiving method for receiving a spatially multiplexed signal transmitted from a plurality of transmitting antennas using a plurality of receiving antennas, including: estimating a channel matrix between the plurality of transmitting antennas and the plurality of receiving antennas, separating the spatially multiplexed signal into a plurality of streams based on a submatrix corresponding to a numerator of a stream separation matrix that is determined according to the channel matrix and an interference canceller scheme and equalizes a phase and amplitude of the spatially multiplexed signal, calculating denominator of the stream separation matrix, correcting a threshold determined according to a modulation scheme of the spatially multiplexed signal using the denominator of the stream separation matrix, calculating likelihoods of the plurality of streams through a threshold decision using the corrected threshold, determining weighting factor proportional to respective signal-to-noise power ratios of the plurality of streams and weighting the likelihood using the weighting factor.

Advantageous Effects of Invention

According to the present invention, it is possible to demodulate a spatially multiplexed signal without using any division operation requiring a large quantity of operation resources.

DESCRIPTION OF EMBODIMENTS

Hereinafter, embodiments of the present invention will be described in detail with reference to the accompanying drawings.

Embodiment 1

Instead of a division operation, the present embodiment will use a multiplication operation with a smaller circuit scale than that of the division operation. This makes it possible to realize the downsizing of the circuit and low power consumption.

Figure 3:
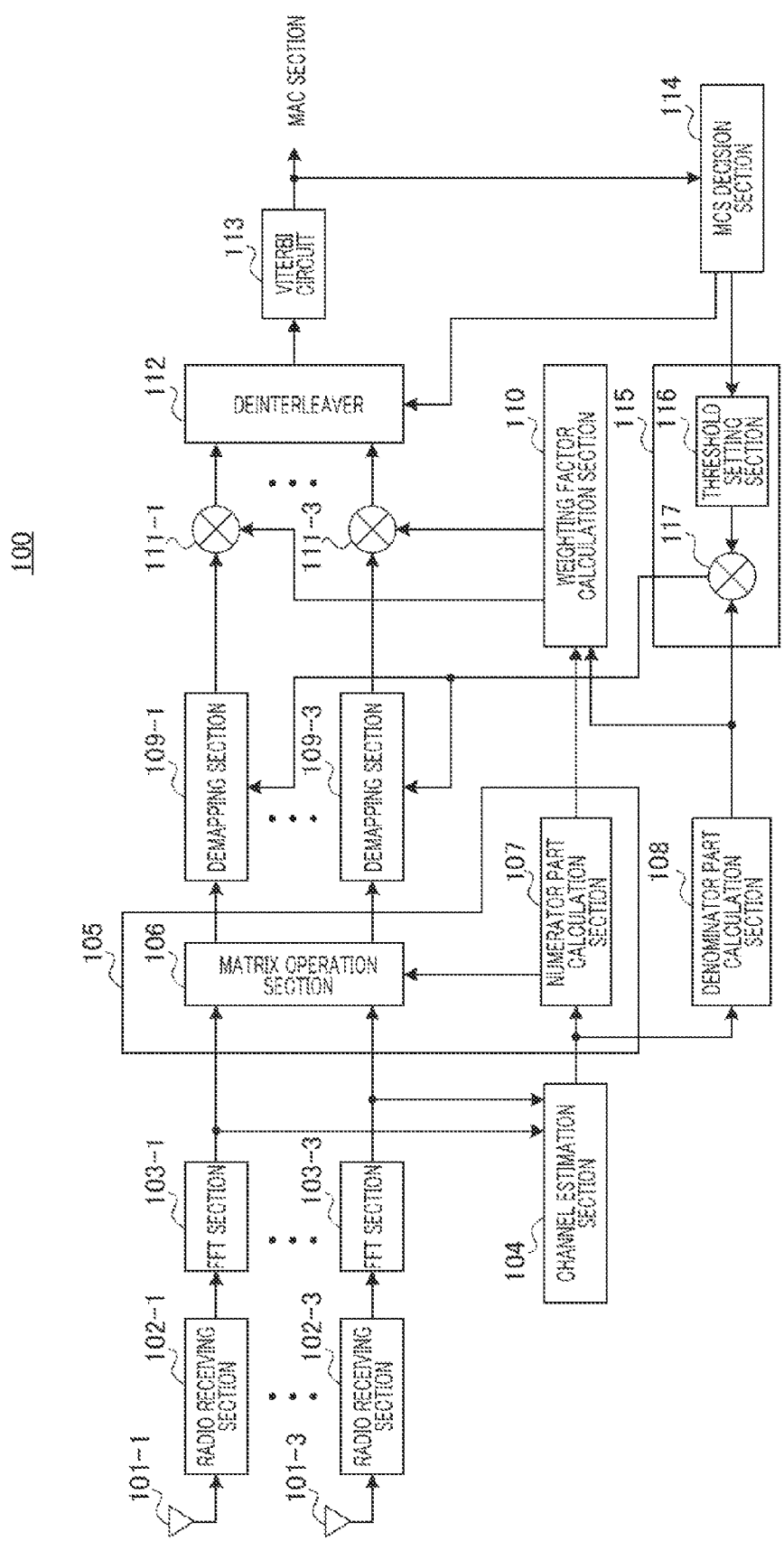
FIG. 3 is a block diagram illustrating an example of main components of a MIMO receiving apparatus according to Embodiment 1 of the present invention.

FIG. 3 is a block diagram illustrating main components of a MIMO receiving apparatus according to an embodiment of the present invention. In the present embodiment, the transmitting side (not shown) transmits signals modulated according to an OFDM (Orthogonal Frequency Division Multiplexing) scheme from a plurality of (N) transmitting antennas. MIMO receiving apparatus 100 according to the present embodiment is assumed to demodulate spatially multiplexed radio signals (a plurality of (N) synchronized streams) transmitted from the transmitting side (not shown). Furthermore, a case will be described below where the number of transmitting antennas/receiving antennas N is 3.

Hereinafter, although a case will be described where MIMO receiving apparatus 100 receives a frame in a configuration used in IEEE802.11n or the like, which is a wireless LAN (Local Area Network) standard as an example, the present invention is not limited to this.

MIMO receiving apparatus 100 shown in FIG. 3 includes receiving antennas 101-1 to 101-3, radio receiving sections 102-1 to 102-3, fast discrete Fourier transform (FFT: Fast Fourier Transform) sections 103-1 to 103-3, channel estimation section 104, stream separation section 105, denominator part calculation section 108, demapping sections 109-1 to 109-3, weighting factor calculation section 110, weighting operation sections 111-1 to 111-3, deinterleaver 112, Viterbi decoder 113, modulation coding scheme (MCS) decision section 114 and threshold correction section 115.

Radio receiving sections 102-1 to 102-3 each receive a radio signal via receiving antennas 101-1 to 101-3 and apply radio reception processing such as down-conversion, A/D (Analog to Digital) conversion to the radio signal. Radio receiving sections 102-1 to 102-3 then output the received signal after the radio reception processing to FFT sections 103-1 to 103-3.

FFT sections 103-1 to 103-3 apply FFT processing to the received signal, transform the received signal after the radio reception processing from a time domain signal to a frequency domain signal and output the frequency domain signal to channel estimation section 104 and stream separation section 105.

Channel estimation section 104 estimates channel matrix H between an i-th transmitting antenna (i=1, 2, 3) on the transmitting side and a j-th receiving antenna 101-$j$ (j=1, 2, 3) on the receiving side using the frequency domain signal. Channel estimation section 104 outputs estimated channel matrix H to stream separation section 105 and denominator part calculation section 108.

Stream separation section 105 includes matrix operation section 106 and numerator part calculation section 107.

Numerator part calculation section 107 calculates a matrix (hereinafter referred to as "numerator submatrix") having coefficients corresponding to numerators of channel matrix H estimated by channel estimation section 104 and stream separation matrix S determined by a canceller scheme as elements thereof. Here, the canceller scheme is a scheme for separating a spatially multiplexed signal into a plurality of streams.

Examples of linear canceller include a ZF criterion and MMSE criterion. For example, when the ZF criterion is used as a canceller scheme that separates a stream, stream separation matrix S becomes inverse matrix G of channel matrix H. Therefore, when the ZF criterion is used as a canceller scheme, numerator part calculation section 107 calculates a matrix having coefficients corresponding to the numerator of inverse matrix G of channel matrix H as elements thereof. Details of the numerator submatrix will be described later.

Numerator part calculation section 107 outputs the calculated numerator submatrix to matrix operation section 106 and weighting factor calculation section 110.

Matrix operation section 106 multiplies the frequency domain signals outputted from FFT sections 103-1 to 103-3 by the numerator submatrix and separates the spatially multiplexed signal into respective streams (also referred to as "MIMO separation"). Matrix operation section 106 then outputs the separated streams to demapping sections 109-1 to 109-3.

Denominator part calculation section 108 calculates coefficients (hereinafter referred to as "denominator coefficients") corresponding to the denominators of channel matrix H and stream separation matrix S determined according to the canceller scheme. For example, when the ZF criterion is used as the canceller scheme, stream separation matrix S becomes inverse matrix G of channel matrix H. Therefore, in this case, denominator part calculation section 108 calculates determinant |H| of channel matrix H as a denominator coefficient. Denominator part calculation section 108 outputs the calculated denominator coefficient to weighting factor calculation section 110 and threshold correction section 115.

Demapping sections 109-1 to 109-3 calculate a likelihood for soft decision error correcting decoding per stream according to the corrected threshold outputted from threshold correction section 115, which will be described later, and outputs the calculated likelihood to weighting operation sections 111-1 to 111-3.

Weighting factor calculation section 110 determines a weighting factor for the likelihood of each stream using the numerator submatrix and the denominator coefficient of stream separation matrix S and outputs the determined weighting factor to weighting operation sections 111-1 to 111-3. The internal configuration of weighting factor calculation section 110 and the method of calculating a weighting factor will be described later.

Weighting operation sections 111-1 to 111-3 perform weighting operation on likelihoods of the respective streams using the weighting factors outputted from weighting factor calculation section 110. Weighting operation sections 111-1 to 111-3 output the likelihoods after the weighting operation to deinterleaver 112.

Deinterleaver 112 switches between deinterleaving patterns according to information of a modulation scheme and a coding rate reported from MCS decision section 114, which will be described later, and performs the reverse operation of the interleaving performed on the transmitting side (deinterleaving). Deinterleaver 112 outputs the deinterleaved likelihoods to Viterbi decoder 113.

Viterbi decoder 113 performs soft decision error correcting decoding on the deinterleaved likelihoods, acquires a decoded word and outputs the acquired decoded words to MCS decision section 114 and a MAC section (not shown).

MCS decision section 114 extracts the information of the modulation scheme and the coding rate determined on the transmitting side from the decoded word outputted from Viterbi decoder 113 and inputs the extracted information to threshold setting section 116. Furthermore, MCS decision section 114 inputs the extracted information to deinterleaver 112.

Threshold correction section 115 includes threshold setting section 116 and correction section 117.

Threshold setting section 116 sets a threshold determined according to the modulation scheme and outputs the set threshold to correction section 117.

Correction section 117 multiplies the threshold outputted from threshold setting section 116 by the denominator coefficient obtained from denominator part calculation section 108 and corrects the threshold. Correction section 117 outputs the corrected threshold to demapping sections 109-1 to 109-3.

Operation of MIMO receiving apparatus 100 configured as shown above will be described. A case will be described below as an example where the ZF criterion is used as a canceller scheme.

A radio signal received via receiving antennas 101-1 to 101-3 is subjected to radio reception processing such as down-conversion, A/D (Analog to Digital) conversion by radio receiving sections 102-1 to 102-3. The received signal after the radio reception processing is subjected to FFT processing by FFT sections 103-1 to 103-3 and transformed from a time domain signal to a frequency domain signal.

Channel estimation section 104 estimates channel matrix H from an i-th transmitting antenna (i=1, 2, 3) on the transmitting side to a j-th receiving antenna 101-$j$ (j=1, 2, 3) on the receiving side using the frequency domain signal.

When the ZF criterion is used as the canceller scheme, stream separation matrix S for separating a spatially multiplexed signal into a plurality of streams becomes inverse matrix G of channel matrix H. For this reason, numerator part calculation section 107 calculates matrix (numerator submatrix) A (see equation 4) having coefficients corresponding to the numerator of inverse matrix G expressed by equation 2 as elements thereof.

(Equation 4)

$$A = {}^t[(-1)^{i+j}|H_{ij}|] \quad [4]$$

As is obvious from a comparison between equation 2 and equation 4, numerator submatrix A is a matrix obtained by multiplying inverse matrix G by determinant |H| as a denominator coefficient.

Matrix operation section 106 multiplies the frequency domain signal by numerator submatrix A and thereby separates the frequency domain signal into the respective streams.

Conventionally, when the canceller scheme is the ZF criterion, the frequency domain signal is multiplied by inverse matrix G expressed by equation 2 as stream separation matrix S. On the other hand, stream separation section 105 of the present embodiment multiplies the frequency domain signal by numerator submatrix A which results from multiplying stream separation matrix S (inverse matrix G) by a denominator coefficient (determinant |H|) instead of stream separation matrix S (inverse matrix G).

Stream separation section 105 applies phase equalization to each stream on a phase space diagram by multiplying the frequency domain signal by numerator submatrix A having coefficients corresponding to the numerator of stream separation matrix S (inverse matrix G) as elements thereof. However, since numerator submatrix A is a matrix resulting from multiplying stream separation matrix S (inverse matrix G) by the denominator coefficient (determinant |H|), stream separation section 105 does not go so far as to perform amplitude normalization processing.

Therefore, in the present embodiment, demapping sections 109-1 to 109-3 after stream separation section 105 perform amplitude normalization on each stream. To be more specific, demapping sections 109-1 to 109-3 perform demapping using the corrected threshold outputted from threshold correction section 115. The corrected threshold is obtained by multiplying a threshold used when multiplying the frequency domain signal by stream separation matrix S (inverse matrix G), by a denominator coefficient (determinant |H|). Amplitude normalization is performed in this way.

Threshold correction section 115 generates thresholds used by demapping sections 109-1 to 109-3 as follows. Threshold setting section 116 outputs amplitude-normalized thresholds to correction section 117. The "amplitude-normalized threshold" is a threshold used for normalization using stream separation matrix S for equalizing the phase and amplitude of a spatially multiplexed signal.

Figure 1:
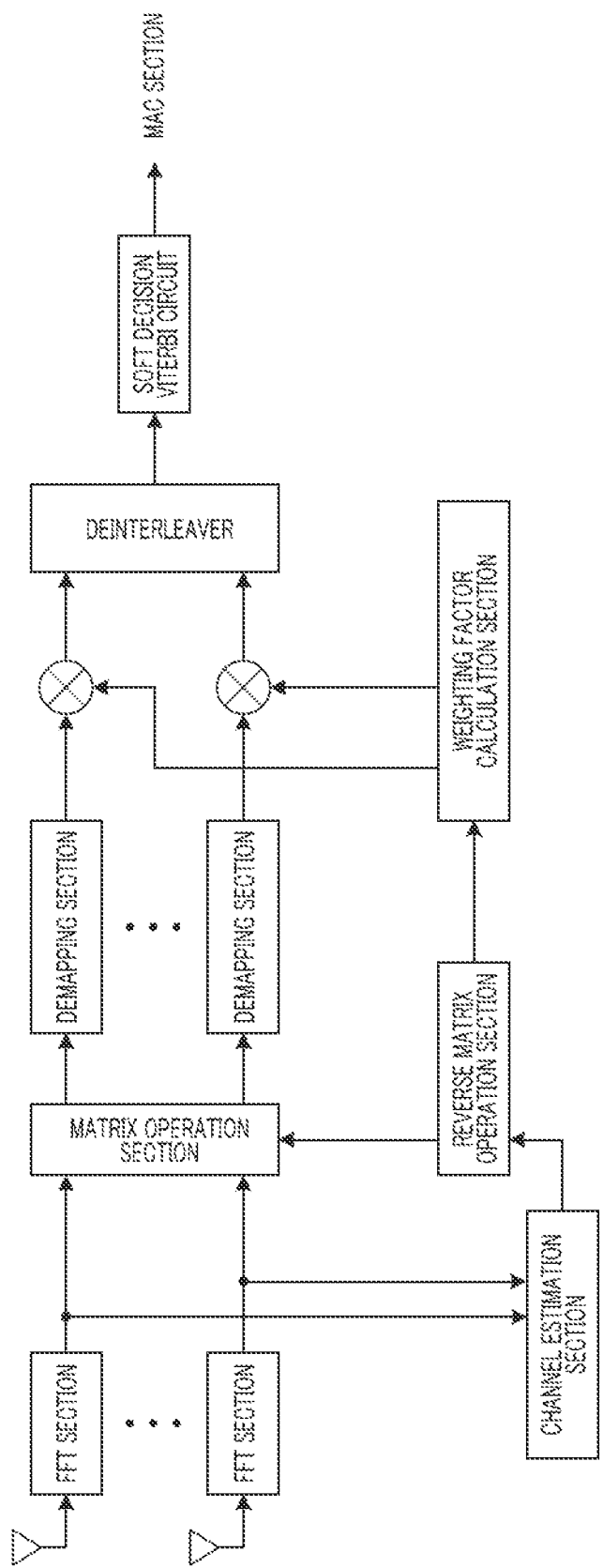
FIG. 1 is a block diagram illustrating an example of main components of a conventional MIMO receiving apparatus.
Figure 2:
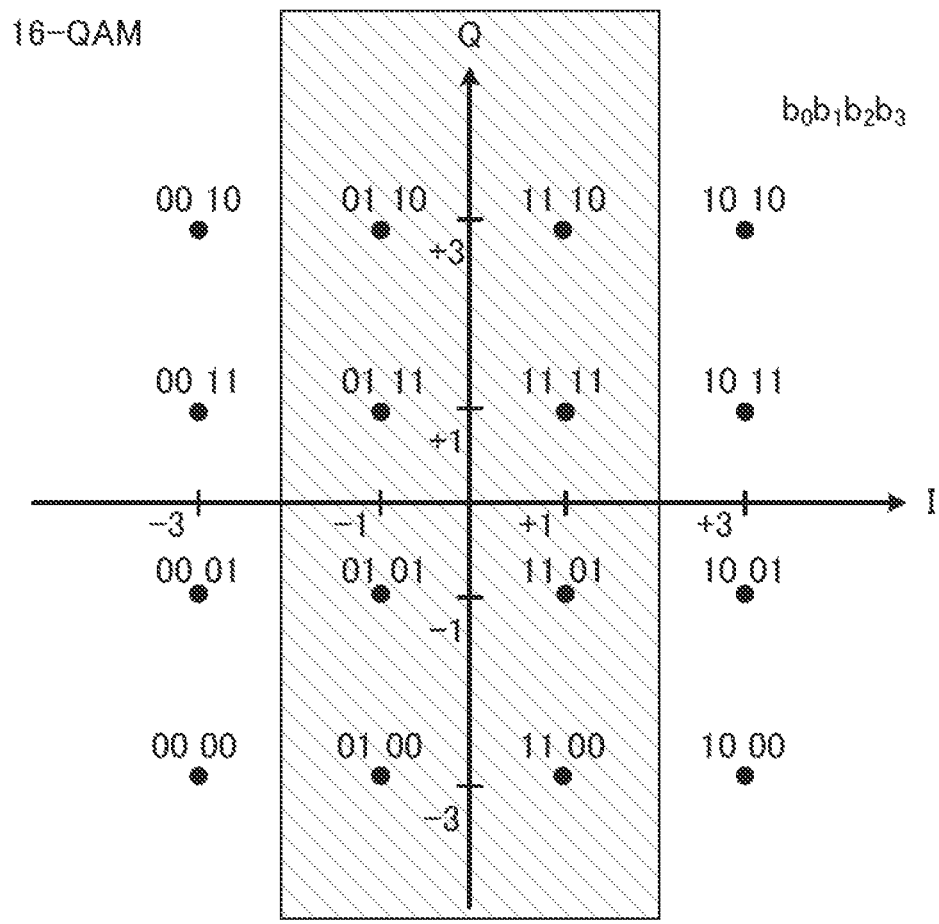
FIG. 2 is a diagram illustrating a constellation for 16QAM on a phase space diagram.

This threshold varies from one modulation scheme to another. For example, in the case where the modulation scheme is 16QAM, threshold setting section 116 sets threshold X for calculating a likelihood of bit b1 of bit stream (b0, b1, b2, b3) to X=±2 as shown in FIG. 2. In the case of IEEE802.11n, information of the modulation scheme is described in a SIGNAL symbol of the preamble part and the modulation scheme of the SIGNAL symbol is fixed to BPSK. Thus, threshold setting section 116 in this case sets a demapping threshold (X=0) for BPSK first. After the SIGNAL symbol is decoded, threshold setting section 116 sets an amplitude-normalized threshold according to the modulation scheme decided by MCS decision section 114.

Correction section 117 multiplies a conventionally used threshold by a denominator coefficient (determinant |H|) and corrects the threshold. Correction section 117 outputs the corrected threshold to demapping sections 109-1 to 109-3.

To exclude the division operation requiring a large quantity of operation resources, threshold correction section 115 multiplies the amplitude-normalized threshold by a denominator coefficient corresponding to the denominator of stream separation matrix S and thereby corrects the threshold. Demapping sections 109-1 to 109-3 calculate the likelihood for soft decision error correcting decoding according to the corrected threshold. In this way, the present embodiment adopts a configuration in which demapping sections 109-1 to 109-3 absorb the influence that matrix operation section 106 multiplies only numerator submatrix A having coefficients corresponding to the numerator of stream separation matrix S as elements thereof. Adopting such a configuration makes it possible to use a multiplication operation instead of a division operation and thereby reduce operation resources.

Weighting operation sections 111-1 to 111-3 multiply the likelihood of each stream by a weighting factor outputted from weighting factor calculation section 110.

Figure 4:
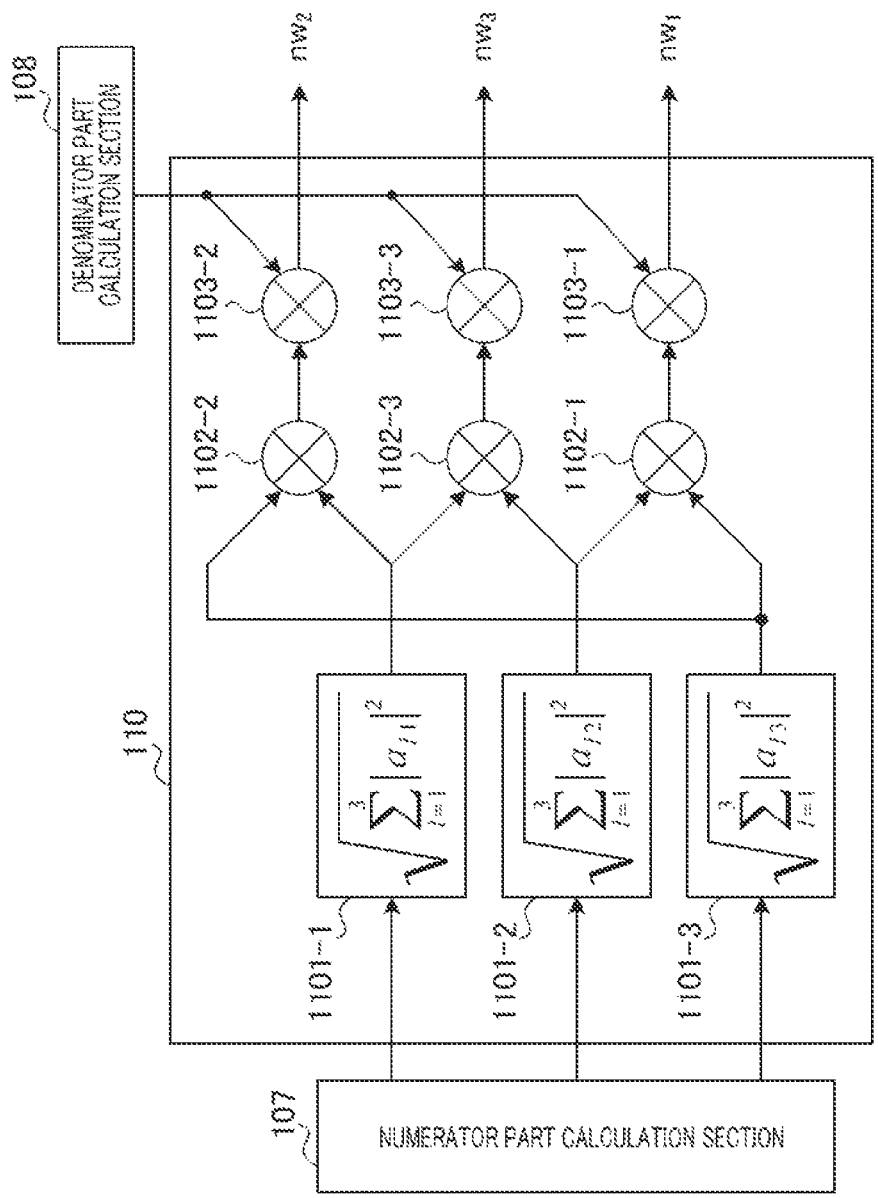
FIG. 4 is a block diagram illustrating an example of an internal configuration of the weighting factor calculation section.

FIG. 4 is a block diagram illustrating an internal configuration of weighting factor calculation section 110 according to the present embodiment. FIG. 4 shows an example of case where the number of receiving antennas N is 3 and the ZF criterion is used as the cancellation scheme.

Weighting factor calculation section 110 includes addition sections 1101-1 to 1101-3, multipliers 1102-1 to 1102-3 and multipliers 1103-1 to 1103-3.

Conventionally, a frequency domain signal is directly multiplied by stream separation matrix S (inverse matrix G of channel matrix H). In this case, weighting factors $w_1$, $w_2$ and $w_3$ shown in equations 5-1 to 5-3 are assigned to the respective streams after MIMO separation.

(Equation 5-1)
$$w_1 = \frac{|H|}{\sqrt{\sum_{l=1}^{N} |a_{l1}|^2}} \quad [5]$$

(Equation 5-2)
$$w_2 = \frac{|H|}{\sqrt{\sum_{l=1}^{N} |a_{l2}|^2}}$$

(Equation 5-3)
$$w_3 = \frac{|H|}{\sqrt{\sum_{l=1}^{N} |a_{l3}|^2}}$$

where, $a_{lm}$ (m=1, 2, 3) is an element of numerator submatrix A.

On the other hand, weighting operation sections 111-1 to 111-3 of the present embodiment use weighting factor $nw_1$, $nw_2$ and $nw_3$ shown in equations 6-1 to 6-3.

(Equation 6-1)
$$nw_1 = |H|\sqrt{\sum_{l=1}^{N} |a_{l2}|^2} \sqrt{\sum_{l=1}^{N} |a_{l3}|^2} \quad [6]$$

(Equation 6-2)
$$nw_2 = |H|\sqrt{\sum_{l=1}^{N} |a_{l1}|^2} \sqrt{\sum_{l=1}^{N} |a_{l3}|^2}$$

(Equation 6-3)
$$nw_3 = |H|\sqrt{\sum_{l=1}^{N} |a_{l1}|^2} \sqrt{\sum_{l=1}^{N} |a_{l2}|^2}$$

That is, weighting factor calculation section 110 calculates weighting factors $nw_1$, $nw_2$ and $nw_3$ by which likelihoods of their respective streams are multiplied according to equations 6-1 to 6-3.

Equations 6-1 to 6-3 for calculating weighting factors $nw_1$, $nw_2$ and $nw_3$ are rewritten using constant C expressed by equation 7 as shown in equations 8-1 to 8-3.

(Equation 7)
$$C = \sqrt{\sum_{l=1}^{3} |a_{l1}|^2} \sqrt{\sum_{l=1}^{3} |a_{l2}|^2} \sqrt{\sum_{l=1}^{3} |a_{l3}|^2} \quad [7]$$

(Equation 8-1)
$$nw_1 = |H|\sqrt{\sum_{l=1}^{N} |a_{l2}|^2} \sqrt{\sum_{l=1}^{N} |a_{l3}|^2} = C \times w_1 \quad [8]$$

(Equation 8-2)
$$nw_2 = |H|\sqrt{\sum_{l=1}^{N} |a_{l1}|^2} \sqrt{\sum_{l=1}^{N} |a_{l3}|^2} = C \times w_2$$

(Equation 8-3)
$$nw_3 = |H|\sqrt{\sum_{l=1}^{N} |a_{l1}|^2} \sqrt{\sum_{l=1}^{N} |a_{l2}|^2} = C \times w_3$$

Here, as is clear from equation 7, constant C is the value obtained by multiplying the denominators of weighting factors $w_1$, $w_2$ and $w_3$ together and is a constant to reduce weighting factors $w_1$, $w_2$ and $w_3$ to a common denominator (constant for reduction to a common denominator).

That is, weighting factors $nw_1$, $nw_2$ and $nw_3$ are values equivalent to the values obtained by reducing weighting factors $w_1$, $w_2$ and $w_3$ to a common denominator using constant C.

To be more specific, weighting factor calculation section 110 calculates weighting factors $nw_1$, $nw_2$ and $nw_3$ as follows. First, addition section 1101-$m$ (m=1, 2, 3) calculates square root $p_m$ of the power sum of element $a_{1m}$ of numerator submatrix A according to equations 9-1 to 9-3.

(Equation 9-1)
$$p_1 = \sqrt{\sum_{l=1}^{3} |a_{l1}|^2} \quad [9]$$

(Equation 9-2)
$$p_2 = \sqrt{\sum_{l=1}^{3} |a_{l2}|^2}$$

(Equation 9-3)
$$p_3 = \sqrt{\sum_{l=1}^{3} |a_{l3}|^2}$$

Addition section 1101-1 then outputs calculated $p_1$ to multipliers 1102-2 and 1102-3. Furthermore, addition section 1101-2 outputs calculated $p_2$ to multipliers 1102-1 and 1102-3. Furthermore, addition section 1101-3 outputs calculated $p_3$ to multipliers 1102-1 and 1102-2.

Multiplier 1102-1 then multiplies $p_2$ and $p_3$ together to acquire $pp_1$ (see equation 10-1) and outputs $pp_1$ to multiplier 1103-1. Furthermore, multiplier 1102-2 multiplies $p_1$ and $p_3$ together to acquire $pp_2$ (see equation 10-2) and outputs $pp_2$ to multiplier 1103-2. Furthermore, multiplier 1102-3 multiplies $p_1$ and $p_2$ together to acquire $pp_3$ (see equation, 10-3) and outputs $pp_3$ to multiplier 1103-3.

(Equation 10-1)
$$pp_1 = \sqrt{\sum_{l=1}^{N} |a_{l2}|^2} \sqrt{\sum_{l=1}^{N} |a_{l3}|^2} \quad [10]$$

-continued (Equation 10-2)

$$pp_2 = \sqrt{\sum_{i=1}^{N} |a_{i1}|^2} \sqrt{\sum_{i=1}^{N} |a_{i3}|^2}$$

(Equation 10-3)

$$pp_3 = |H| \sqrt{\sum_{i=1}^{N} |a_{i1}|^2} \sqrt{\sum_{i=1}^{N} |a_{i2}|^2}$$

Multiplier 1103-1 then multiplies $pp_1$ and the denominator coefficient (determinant |H|) together to acquire weighting factor $nw_1$ (see equation 6-1). Furthermore, multiplier 1103-2 multiplies $pp_2$ and the denominator coefficient (determinant |H|) together to acquire weighting factor $nw_2$ (see equation 6-2). Furthermore, multiplier 1103-3 multiplies $pp_3$ and the denominator coefficient (determinant |H|) together to acquire weighting factor $nw_3$ (see equation 6-3).

Thus, weighting factor calculation section 110 acquires values equivalent to the values obtained by reducing weighting factors $w_1$, $w_2$ and $w_3$ to a common denominator using constant C as weighting factors $nw_1$, $nw_2$ and $nw_3$. Constant C is a constant for reduction to a common denominator obtained by multiplying the respective denominators of weighting factors $w_1$, $w_2$ and $w_3$.

Thus, to maximize the performance of the soft decision error correcting decoder, the present embodiment can also remove the division operation necessary to calculate weighting factors by which the streams after MIMO separation are multiplied.

Weighting factors $w_1$, $w_2$ and $w_3$ obtained by equations 5-1 to 5-3 and weighting factors $nw_1$, $nw_2$ and $nw_3$ after reduction to a common denominator obtained by equations 6-1 to 6-3 have the same ratio between the respective coefficients. Therefore, the ratio among the streams can be maintained even when using weighting factors $nw_1$, $nw_2$ and $nw_3$ equivalent to the result of reducing weighting factors $w_1$, $w_2$ and $w_3$ to a common denominator instead of weighting factors $w_1$, $w_2$ and $w_3$.

Thus, weighting factor calculation section 110 calculates weighting factors $nw_1$, $nw_2$ and $nw_3$ equivalent to the result of reducing weighting factors $w_1$, $w_2$ and $w_3$ to a common denominator instead of weighting factors $w_1$, $w_2$ and $w_3$. This eliminates the necessity for a division operation in weighting factor calculation section 110 and can consequently reduce operation resources, reduce the circuit scale and realize low power consumption.

As described above, stream separation section 105 in the present embodiment separates a spatially multiplexed signal into a plurality of streams based on numerator submatrix A. Numerator submatrix A is determined by channel matrix H and a canceller scheme, and corresponds to the numerator of stream separation matrix S that equalizes the phase and amplitude of the spatially multiplexed signal. Furthermore, denominator part calculation section 108 calculates a denominator (denominator coefficient) of stream separation matrix S and correction section 117 corrects the threshold determined by the modulation scheme of the spatially multiplexed signal using the denominator (denominator coefficient) of stream separation matrix S. Demapping sections 109-1 to 109-3 calculate likelihoods of a plurality of streams through a threshold decision using the corrected threshold. This makes it possible to calculate the amplitude and phase using a multiplication operation instead of a division operation and calculate a likelihood of each stream, and thereby reduce operation resources.

Furthermore, weighting factor calculation section 110 calculates weighting factors proportional to respective signal-to-noise power ratios of a plurality of streams using numerator submatrix A and the denominator (denominator coefficient) of stream separation matrix S. This also eliminates the necessity for a division operation in weighting factor calculation section 110, and can thereby reduce operation resources.

A case has been described above where addition section 1101-$m$ (m=1, 2, 3) calculates square root pm of the power sum of element $a_{1m}$ of numerator submatrix A according to equations 9-1 to 9-3. On the other hand, instead of the square root of the power sum of element $a_{1m}$ of numerator submatrix A, addition section 1101-$m$ (m=1, 2, 3) may also calculate the power sum of element $a_{1m}$ of numerator submatrix A according to equations 11-1 to 11-3.

(Equation 11-1)

$$\sum_{l=1}^{3} |a_{l1}|^2 \qquad [11]$$

(Equation 11-2)

$$\sum_{l=1}^{3} |a_{l2}|^2$$

(Equation 11-3)

$$\sum_{l=1}^{3} |a_{l3}|^2$$

Although a case has been described above where the number of transmitting antennas/receiving antennas N is 3, the present invention is not limited to this. When the number of transmitting antennas/receiving antennas N is other than 3, it may be possible to provide as many radio receiving sections, FFT sections and demapping sections as antennas.

Figure 5:
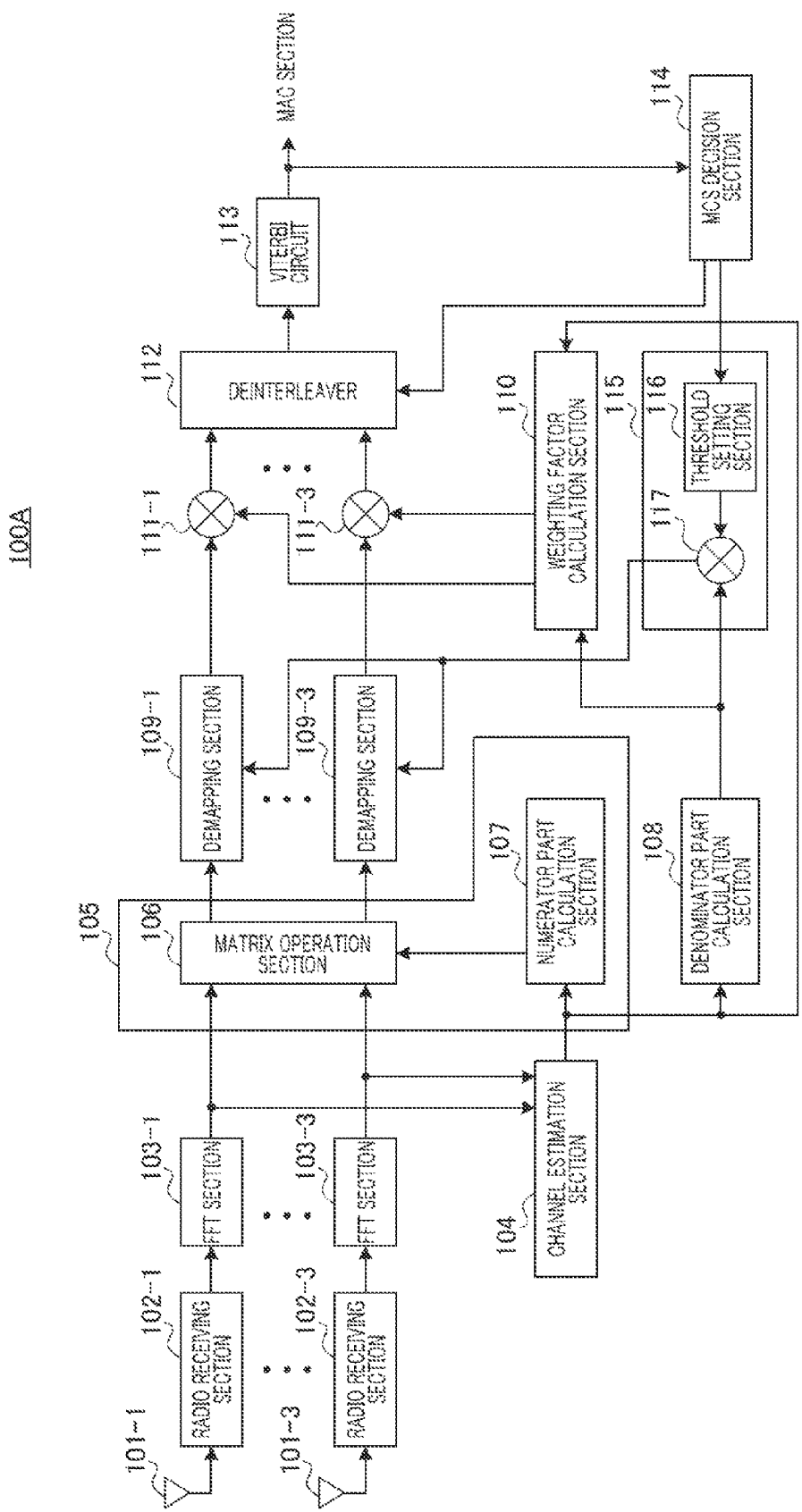
FIG. 5 is a block diagram illustrating an example of main components of the MIMO receiving apparatus according to Embodiment 1.

Furthermore, when the number of transmitting antennas/receiving antennas N is 2, channel matrix H is a matrix with two rows and two columns, and so weighting factor calculation section 110 can calculate weighting factors also using channel matrix H instead of numerator submatrix A. FIG. 5 shows main components of the MIMO receiving apparatus in this case. In MIMO receiving apparatus 100A of FIG. 5, components common to MIMO receiving apparatus 100 in FIG. 3 are assigned the same reference numerals as those in FIG. 3. MIMO receiving apparatus 100A in FIG. 5 adopts a configuration in which the connection from numerator part calculation section 107 to weighting factor calculation section 110 is deleted and a connection from channel estimation section 104 to weighting factor calculation section 110 is added with respect to MIMO receiving apparatus 100 in FIG. 3.

In MIMO receiving apparatus 100A in FIG. 5, weighting factor calculation section 110 can directly calculate weighting factors from channel matrix H. Therefore, numerator part calculation section 107 can shorten the operation time until the weighting factors are acquired by the operation time of numerator submatrix A.

A case has been described above where stream separation section 105 and weighting factor calculation section 110 use a linear interference canceller of the ZF criterion, but the present invention is not limited to this. For example, the present invention is also applicable to a case where a linear interference canceller of the MMSE criterion is used for stream separation section 105 and weighting factor calculation section 110. The MMSE criterion is different from the ZF criterion in that weighting factor calculation section 110 estimates a signal-to-noise power ratio per subcarrier and adds the estimated signal-to-noise power ratio to the diagonal component of channel matrix H. Therefore, in the case of the MMSE criterion, weighting factor calculation section 110 can use a configuration similar to that in the case of the ZF criterion.

That is, in the case of the MMSE criterion, stream separation matrix S expressed by equation 12 instead of equation 2 is used.

(Equation 12)

$$S = (H^H H + \sigma^2 I)^{-1} \quad [12]$$

In equation 12, $\sigma^2$ is a signal-to-noise power ratio and I is a unit matrix.

Embodiment 2

The present embodiment adopts a configuration that provides good reception performance even when receiving power varies between symbols or between subcarriers due to influences of a dip in the frequency domain that occurs in a multipath environment.

That is, a MIMO receiving apparatus which can not only improve the degree of interference between streams in the spatially multiplexed channel in Embodiment 1 but also reduce influences of multipath will be described.

Figure 6:
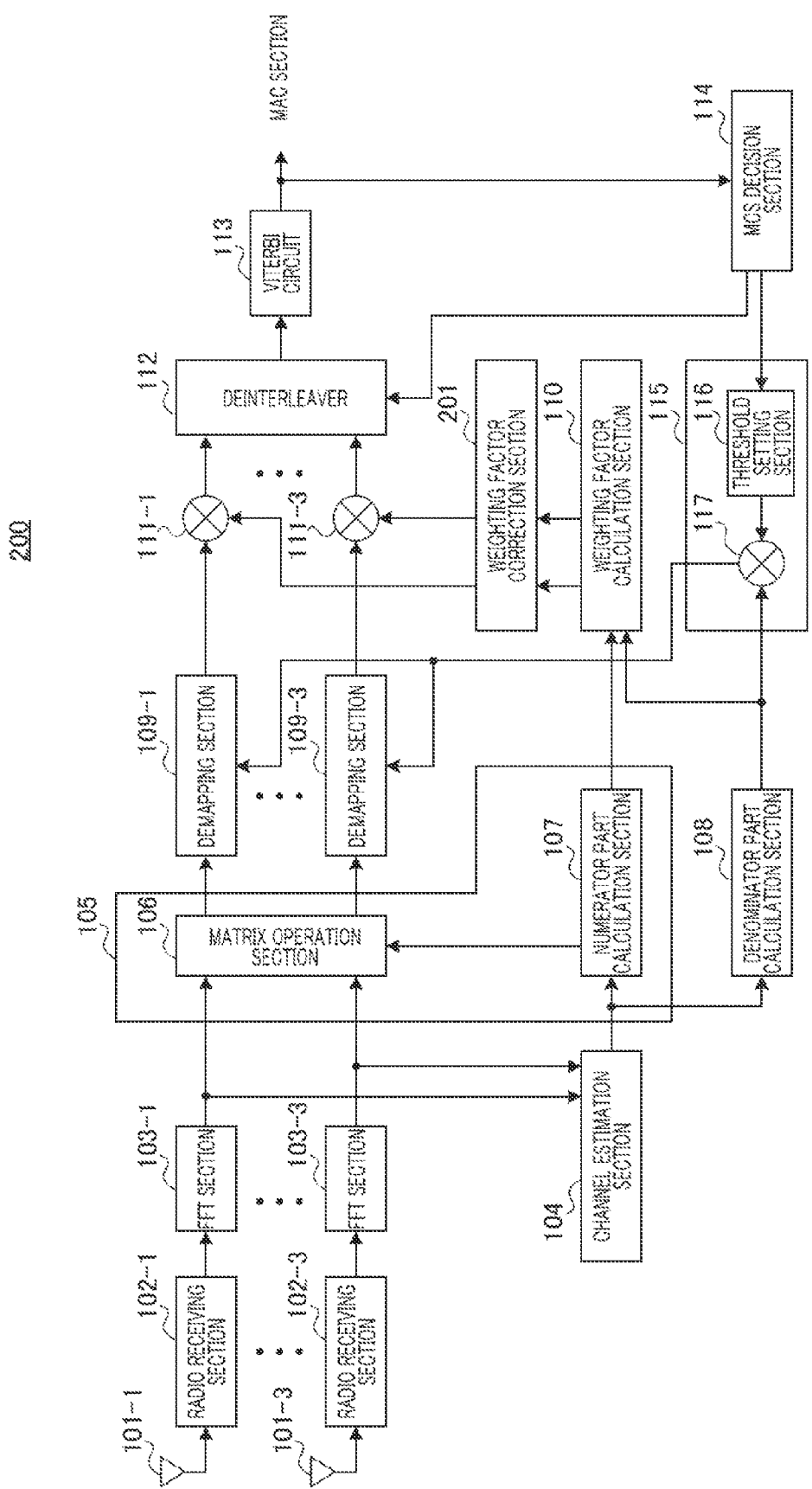
FIG. 6 is a block diagram illustrating an example of main components of a MIMO receiving apparatus according to Embodiment 2 of the present invention.

FIG. 6 is a block diagram illustrating main components of the MIMO receiving apparatus according to the present embodiment. In the MIMO receiving apparatus according to the present embodiment in FIG. 6, components common to those in FIG. 3 will be assigned the same reference numerals as those in FIG. 3 and descriptions thereof will be omitted. MIMO receiving apparatus 200 in FIG. 6 adopts a configuration in which weighting factor correction section 201 is added to MIMO receiving apparatus 100 in FIG. 3.

Figure 7:
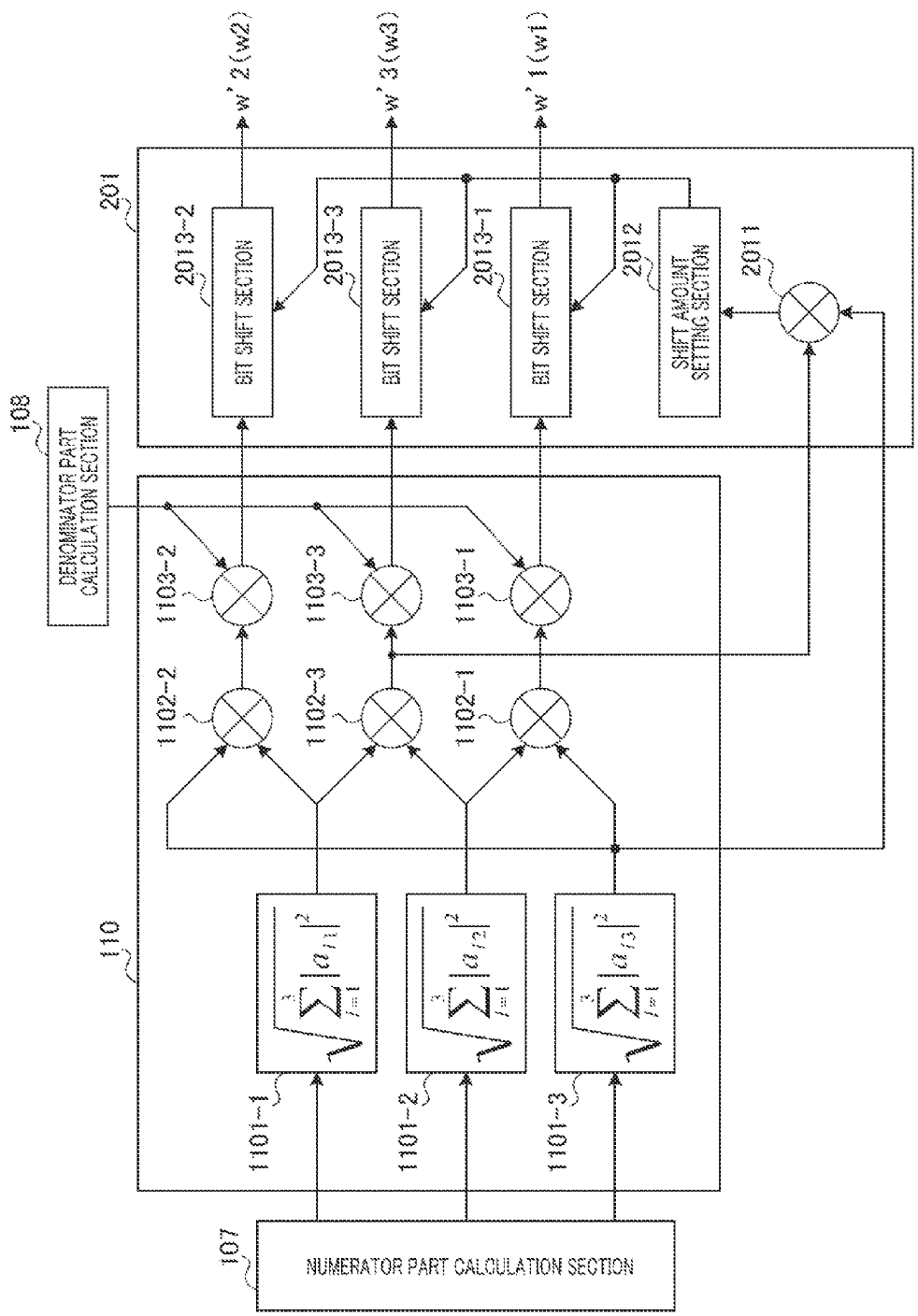
FIG. 7 is a block diagram illustrating an example of an internal configuration of the weighting factor calculation section and weighting factor correction section.

FIG. 7 is a diagram illustrating an internal configuration of weighting factor correction section 201. Weighting factor correction section 201 includes multiplication section 2011, shift amount setting section 2012 and bit shift sections 2013-1 to 2013-3.

Multiplication section 2011 receives $pp_3$ (see equation 10-3) outputted from multiplication section 1102-3 and $p_3$ (see equation 9-3) outputted from addition section 1101-3 as input. Multiplication section 2011 multiplies $pp_3$ and $p_3$ together. This makes it possible to acquire constant C (see equation 7) by which each weighting factor is multiplied when each weighting factor is reduced to a common denominator.

Multiplication section 2011 outputs constant C to shift amount setting section 2012.

Bit shift sections 2013-1 to 2013-3 shift weighting factors $nw_1$, $nw_2$ and $nw_3$ according to the number of bit shifts and the shift direction instructed from shift amount setting section 2012, which will be described later. Weighting factors $nw_1$, $nw_2$ and $nw_3$ are digital values. Thus, when, for example, shift amount setting section 2012 reports an instruction of shifting k bits rightward to bit shift section 2013-1, the magnitude of weighting factor $nw_1$ is multiplied $1/(2^k)$-fold.

Shift amount setting section 2012 sets the number of bit shifts and the shift direction of weighting factors $nw_1$, $nw_2$ and $nw_3$ acquired by multiplication sections 1103-1 to 1103-3 according to constant C. Next, shift amount setting section 2012 outputs a command signal instructing the set number of bit shifts and the shift direction to bit shift sections 2013-1 to 2013-3.

To be more specific, shift amount setting section 2012 selects reference value $1/(2^k)$, which is closest to the reciprocal of constant C. Shift amount setting section 2012 reports k as the number of bit shifts and the sign of k as the shift direction to bit shift sections 2013-1 to 2013-3. Thus, bit shift sections 2013-1 to 2013-3 multiply each of weighting factors $nw_1$, $nw_2$ and $nw_3$ $1/(2^k)$-fold.

Here, when $1/(2^k)$ matches the reciprocal of constant C, weighting factors $w_1$, $w_2$ and $w_3$ similar to conventional ones are outputted from bit shift sections 2013-1 to 2013-3. For this reason, weighting operation sections 111-1 to 111-3 multiply likelihoods of the respective streams by weighting factors $w_1$, $w_2$ and $w_3$, which are accurate signal-to-noise power ratios, and MIMO receiving apparatus 100 thereby demonstrates good reception performance as in the case of the prior art.

On the other hand, when there is no $1/(2^k)$ that matches the reciprocal of constant C, reference value $1/(2^k)$ (=constant C') closest to the reciprocal of constant C is selected. Thus, bit shift sections 2013-1 to 2013-3 output weighting factors $w'_1$, $w'_2$ and $w'_3$ close to conventional weighting factors $w_1$, $w_2$ and $w_3$.

Here, weighting factors $w'_1$, $w'_2$ and $w'_3$ and weighting factors $w_1$, $w_2$ and $w_3$ have the following relationship.

(Equation 13-1)

$$w'_1 = w_1 \times C/C'$$

(Equation 13-2)

$$w'_2 = w_2 \times C/C'$$

(Equation 13-3)

$$w'_3 = w_3 \times C/C' \quad [13]$$

Of course, weighting factor correction section 201 may use a multiplier instead of bit shift sections 2013-1 to 2013-3 to only improve the decoding accuracy. In this case, the multiplier may multiply each of weighting factors $nw_1$, $nw_2$ and $nw_3$ by the reciprocal of constant C. However, in this case, a division operation is required to calculate the reciprocal of constant C, which leads to an increase in the circuit scale.

However, as described above, limiting the amount of division operation to constant $C'=1/(2^k)$ (k is an integer) allows bit shift sections 2013-1 to 2013-3 to perform a division operation. Although the reception performance deteriorates to a certain degree, this eliminates the necessity for a division operation, and can avoid the circuit scale from increasing.

As described above, bit shift sections 2013-1 to 2013-3 of weighting factor correction section 201 in the present embodiment bit-shift weighting factors and adjust the magnitude of the weighting factors. Multiplication section 2011 multiplies the power sum or the square root of elements of the numerator submatrix for acquiring each stream and outputs a constant for reduction to a common denominator. Bit shift amount setting section 2012 determines k (k is an integer) corresponding to $1/(2^k)$ closest to the reciprocal of the constant for reduction to a common denominator. Next, bit shift amount setting section 2012 then outputs the magnitude of k and the sign of k as the amount of bit shift and the bit shift direction in bit shift sections 2013-1 to 2013-3. Weighting operation sections 111-1 to 111-3 weight likelihoods using the weighting factors adjusted by bit shift sections 2013-1 to 2013-3.

Thus, by correcting weighting factors $nw_1$, $nw_2$ and $nw_3$ according to the constant for reduction to a common denominator using bit shift sections 2013-1 to 2013-3 instead of a division operation, it is possible to reduce influences of multipath compared to Embodiment 1.

A case has been described above where bit shift sections 2013-1 to 2013-3 simply bit-shift weighting factors by k bits leftward or rightward according to a command signal from shift amount setting section 2012. That is, in this case, the division operation is limited to $1/(2^k)$.

By contrast, the present invention may also be adapted so that each of bit shift sections 2013-1 to 2013-3 is made up of a plurality of bit shift sections and the plurality of bit shift sections perform different bit shift operations and add up these operation results. In this case, the limitation on the amount of division operation is reduced in a smaller circuit scale than when a division operation of an arbitrary coefficient is performed. Therefore, it is possible to calculate weighting factors with fewer errors and deterioration of the reception performance is reduced.

Furthermore, shift amount setting section 2012 may also be adapted so as to have a lookup table (LUT) in which constant C is associated with k and output k corresponding to constant C.

Embodiment 3

The present embodiment will describe a case where the number of receiving antennas N on the receiving side is greater than the number of transmitting antennas M on the transmitting side and channel matrix H is not a square matrix and describe a MIMO receiving apparatus which performs N lines of FFT processing.

The present embodiment will take advantage of the fact that when channel matrix H is not a square matrix, it is possible to separate a spatially multiplexed signal into a plurality of streams by performing linear interference cancellation using "pseudo-inverse matrix (or also referred to as "generalized inverse matrix")."

Here, the "pseudo-inverse matrix" refers to matrix F given by equation 14.

(Equation 14)

$$F=(H^H H)^{-1} H^H \qquad [14]$$

In equation 14, $H^H$ is a Hermitian conjugate matrix of channel matrix H. Here, the Hermitian conjugate matrix is a matrix resulting from wrapping around rows and columns of an original matrix along the diagonal thereof and replacing each element by a complex conjugate of each element. The present embodiment will take advantage of the fact that the product of channel matrix H and Hermitian conjugate matrix $H^H$ thereof becomes a square matrix.

Here, the square matrix expressed by the product of channel matrix H and Hermitian conjugate matrix $H^H$ thereof is defined as matrix B expressed by equation 15.

(Equation 15)

$$B=H^H H \qquad [15]$$

Figure 8:
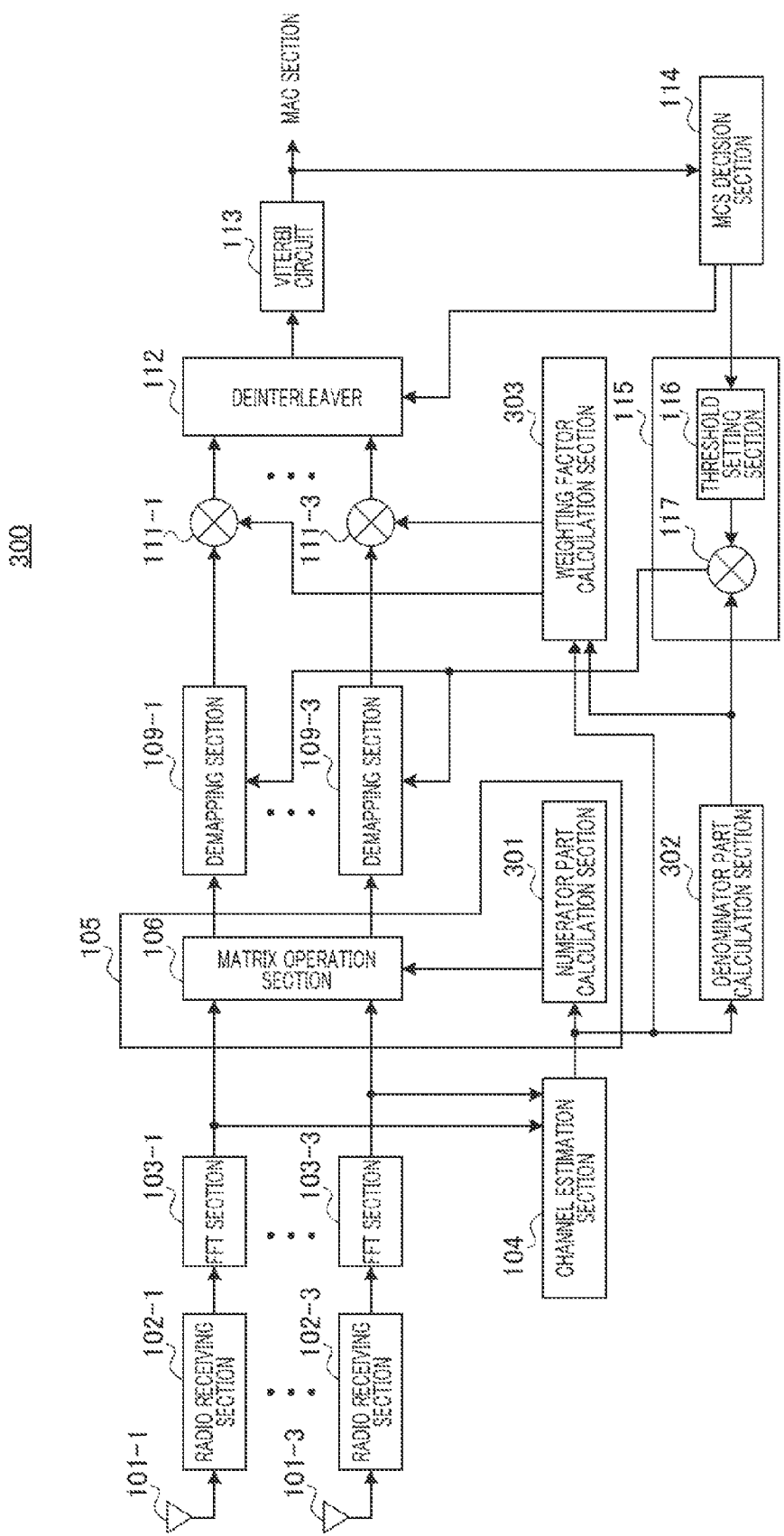
FIG. 8 is a block diagram illustrating an example of main components of a MIMO receiving apparatus according to Embodiment 3 of the present invention.

FIG. 8 is a block diagram illustrating main components of a MIMO receiving apparatus according to the present embodiment. In the MIMO receiving apparatus according to the present embodiment in FIG. 8, components common to those in FIG. 3 will be assigned the same reference numerals as those in FIG. 3 and descriptions thereof will be omitted. MIMO receiving apparatus 300 in FIG. 8 includes numerator part calculation section 301, denominator part calculation section 302 and weighting factor calculation section 303 instead of numerator part calculation section 107, denominator part calculation section 108 and weighting factor calculation section 110 of MIMO receiving apparatus 100 in FIG. 3.

Channel estimation section 104 estimates channel matrix H from an i-th transmitting antenna (i=1, 2, . . . , M) on the transmitting side to a j-th receiving antenna 101-$j$ (j=1, 2, . . . , N) on the receiving side using a frequency domain signal. Channel estimation section 104 outputs estimated channel matrix H to numerator part calculation section 301, denominator part calculation section 302 and weighting factor calculation section 303.

Numerator part calculation section 301 calculates a matrix (numerator submatrix) A' having coefficients corresponding to the numerator of square matrix B (see equation 15)) as elements thereof (see equation 16).

(Equation 16)

$$A'=^t[(-1)^{i+j}|B_{ij}|] \qquad [16]$$

Numerator part calculation section 301 outputs calculated numerator submatrix A' to matrix operation section 106.

Matrix operation section 106 multiplies the frequency domain signals outputted from FFT sections 103-1 to 103-N by numerator submatrix A' and separates the spatially multiplexed signal into respective streams (MIMO separation).

Thus, when the channel matrix is not a square matrix, stream separation section 105 separates the spatially multiplexed signal into a plurality of streams using numerator submatrix A'. Numerator submatrix A' is a matrix having coefficients corresponding to the numerator of square matrix B represented by the product of channel matrix H and Hermitian conjugate matrix $H^H$ as elements thereof.

Denominator part calculation section 302 calculates determinant |B| of square matrix B obtained using equation 15 from channel matrix H estimated from channel estimation section 104 and outputs determinant |B| obtained to correction section 117 and weighting factor calculation section 303.

Thus, correction section 117 multiplies a threshold outputted from threshold setting section 116 by determinant |B| obtained from denominator part calculation section 302 and thereby corrects the threshold. Demapping sections 109-1 to 109-N then calculate likelihoods for soft decision error correcting decoding for the respective streams after the separation according to the corrected threshold.

Weighting factor calculation section 303 sets weighting factors for M streams. When, for example, M=2 and N=3, weighting factor calculation section 110 calculates weighting factors $nw_1$ and $nw_2$ according to equations 17-1 and 17-2.

(Equation 17-1)

$$nw_1 = |B| \sqrt{\sum_{i=1}^{3} |d_{i2}|^2} \qquad [17]$$

(Equation 17-2)

$$nw_2 = |B| \sqrt{\sum_{i=1}^{3} |d_{i1}|^2}$$

Here, $d_{1n}$ (n=1, 2, 3) are elements of numerator submatrix D (see equation 18) having coefficients corresponding to the numerator of generalized inverse matrix F of channel matrix H as elements thereof.

(Equation 18)

$$D = {}^t[(-1)^{i+j}|F_{ij}|] \quad [18]$$

A case has been described above in the present embodiment where the number of receiving antennas is greater than the number of transmitting antennas. Numerator part calculation section 301 calculates first submatrix A'(see equation 16) corresponding to the numerator of stream separation matrix S and second submatrix D (see equation 18) corresponding to the numerator of pseudo-inverse matrix F using square matrix B. Square matrix B is based on the product of channel matrix H and Hermitian conjugate matrix $H^H$ of the channel matrix (see equation 15). Matrix operation section 106 separates a spatially multiplexed signal into a plurality of streams using first submatrix A' and denominator part calculation section 302 calculates a determinant of square matrix B as a denominator coefficient of stream separation matrix S. Next, weighting factor calculation section 303 determines weighting factors of the plurality of streams using denominator coefficients of second submatrix D and stream separation matrix S.

When the number of transmitting antennas is different from the number of receiving antennas, a division operation becomes unnecessary in the amplitude and equalization processing or weighting factor determining processing, and therefore operation resources can be reduced.

A case has been described above where stream separation section 105 and weighting factor calculation section 303 use a linear interference canceller of the ZF criterion, but the present invention is not limited to this. The present invention is also applicable, for example, when stream separation section 105 and weighting factor calculation section 303 use a linear interference canceller of the MMSE criterion. The case of the MMSE criterion is different from the case of the ZF criterion in that weighting factor calculation section 303 estimates a signal-to-noise power ratio per subcarrier and adds the estimated signal-to-noise power ratio to diagonal components of channel matrix H. Therefore, even in the case of the MMSE criterion, weighting factor calculation section 303 can also use a configuration similar to that of the ZF criterion.

That is, in the case of the MMSE criterion, pseudo-inverse matrix F expressed by equation 19 instead of equation 14 is used.

(Equation 19)

$$F = (H^H H + \sigma^2 I)^{-1} H^H \quad [19]$$

In equation 19, $\sigma^2$ is a signal-to-noise power ratio and I is a unit matrix.

Embodiment 1 to Embodiment 3 have been described so far.

A case has been described in the above-described embodiments where the stream separation section and the weighting factor calculation section separate a spatially multiplexed signal into a plurality of streams and calculate likelihoods using a linear interference canceller scheme. However, the canceller scheme is not limited to this. The present invention is also applicable, for example, to a case where the stream separation section and the weighting factor calculation section use a successive interference canceller (SIC) scheme.

Furthermore, in the descriptions of the above-described embodiments, stream separation matrix S is also referred to as a weighting matrix.

Embodiment 4

Embodiment 1 to Embodiment 3 have described a MIMO receiving apparatus. The present embodiment will describe a SISO (Single Input Single Output) receiving apparatus. As in the case of Embodiment 1, instead of the division operation, the present embodiment uses a multiplication operation having a smaller circuit scale than the division operation. This makes it possible to realize downsizing of the circuit and low power consumption.

Figure 9:
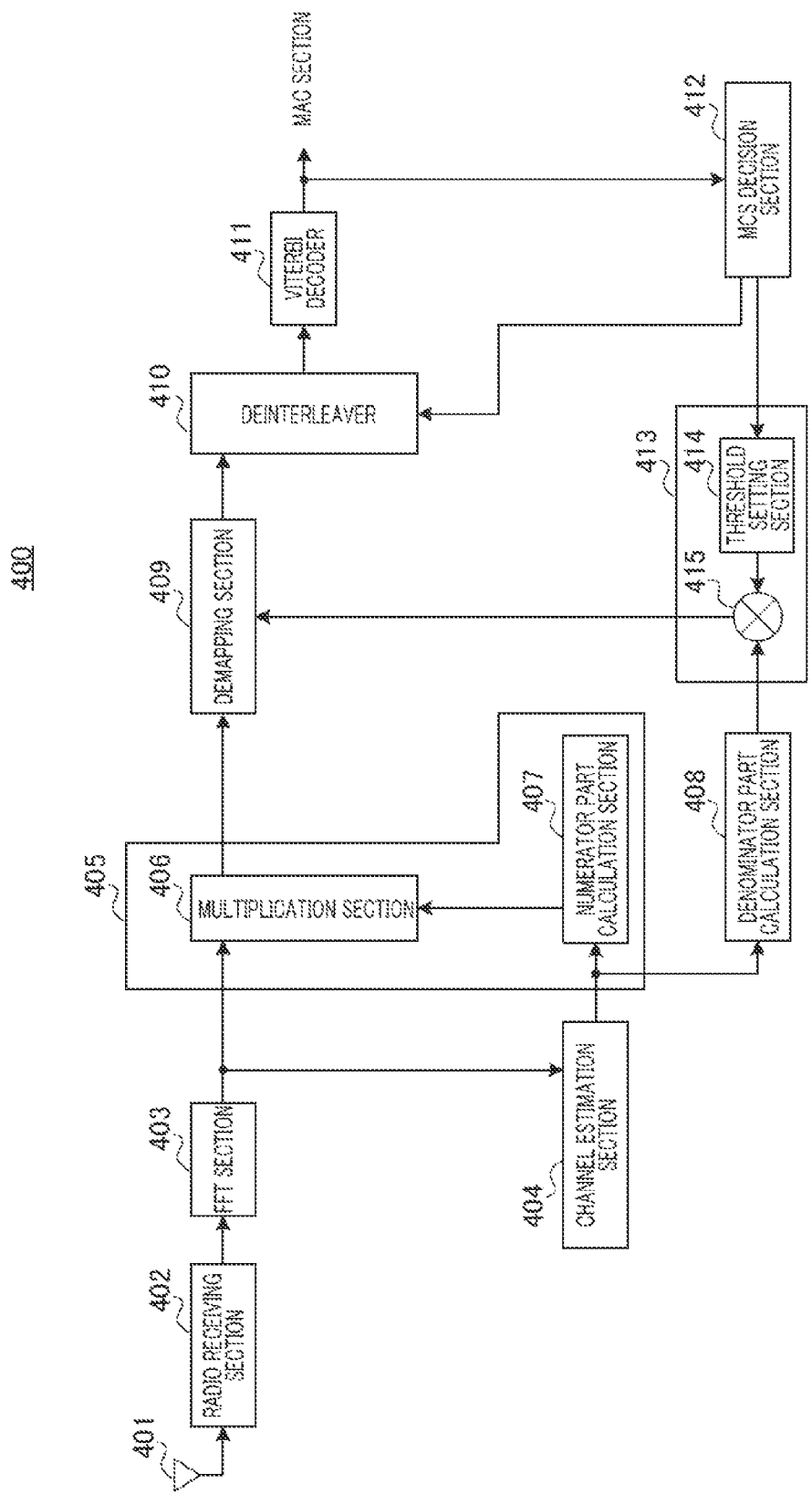
FIG. 9 is a block diagram illustrating an example of main components of a SISO receiving apparatus according to Embodiment 4 of the present invention.

FIG. 9 is a block diagram illustrating main components of a SISO receiving apparatus according to the embodiment of the present invention. SISO receiving apparatus 400 according to the present embodiment is assumed to demodulate a radio signal modulated according to an OFDM scheme on the transmitting side (not shown) and transmitted from a single transmitting antenna.

A case will be described below where SISO receiving apparatus 400 receives a frame having a configuration used in IEEE802.11n or the like, which is a wireless LAN (Local Area Network) standard as an example. The present invention, however, is not limited to this.

SISO receiving apparatus 400 shown in FIG. 9 includes receiving antenna 401, radio receiving section 402, FFT section 403, channel estimation section 404, equalization processing section 405, denominator part calculation section 408, demapping section 409, deinterleaver 410, Viterbi decoder 411, MCS decision section 412 and threshold correction section 413.

Radio receiving section 402 receives a radio signal transmitted from the transmitting side (not shown) via receiving antenna 401 and applies radio reception processing, such as down-conversion, A/D conversion to the radio signal. Radio receiving section 402 then outputs the received signal after the radio reception processing to FFT section 403.

FFT section 403 applies FFT processing to the received signal, transforms the received signal after the radio reception processing from a time domain signal to a frequency domain signal, and outputs the frequency domain signal to channel estimation section 404 and equalization processing section 405.

Channel estimation section 404 estimates channel matrix H between the transmitting antenna on the transmitting side and receiving antenna 401 on the receiving side using the frequency domain signal. Channel estimation section 404 outputs the estimated channel estimate value to equalization processing section 405 and denominator part calculation section 408.

Equalization processing section 405 includes multiplication section 406 and numerator part calculation section 407.

Numerator part calculation section 407 calculates coefficients corresponding to the numerators of a channel estimate value estimated by channel estimation section 104 and an equalized value determined according to the frequency domain equalization scheme. Here, the "frequency domain equalization scheme" is a scheme for equalizing influences in a multipath environment according to a signal-to-noise power ratio of each frequency component of the frequency domain signal. Examples of the frequency domain equalization scheme include a ZF criterion and MMSE criterion, and when, for example, the ZF criterion is used for the frequency domain equalization scheme, the equalized value becomes a conjugate complex number of the channel estimate value.

Multiplication section 406 multiplies the frequency domain signal outputted from FFT section 403 by a coefficient corresponding to the numerator of the equalized value and performs only phase equalization. Multiplication section 406 then outputs the signal after the phase equalization to demapping section 409.

Denominator part calculation section 408 calculates coefficients (hereinafter referred to as "denominator coefficients") corresponding to the denominators of the channel estimate value and the equalized value determined according to the frequency domain equalization scheme. When, for example, the ZF criterion is used for the frequency domain equalization scheme, the equalized value becomes a conjugate complex number of the channel estimate value. Therefore, in this case, denominator part calculation section 408 calculates an absolute value of the channel estimate value as the denominator coefficient. Denominator part calculation section 408 outputs the calculated denominator coefficient to threshold correction section 413.

Demapping section 409 calculates a likelihood for soft decision error correcting decoding according to the corrected threshold outputted from threshold correction section 413, which will be described later, and outputs the calculated likelihood to deinterleaver 410.

Deinterleaver 410 switches between deinterleaving patterns according to information of a modulation scheme and a coding rate reported from MCS decision section 412, which will be described later, and the transmitting side performs the reverse operation of interleaving (deinterleaving). Deinterleaver 410 outputs the deinterleaved likelihood to Viterbi decoder 411.

Viterbi decoder 411 performs soft decision error correcting decoding on the deinterleaved likelihood, acquires a decoded word and outputs the acquired decoded word to MCS decision section 412 and a MAC section (not shown).

MCS decision section 412 extracts the information of the modulation scheme and the coding rate determined on the transmitting side from the decoded word outputted from Viterbi decoder 411 and inputs the extracted information to threshold setting section 414. Furthermore, MCS decision section 412 inputs the extracted information to deinterleaver 410.

Threshold correction section 413 has threshold setting section 414 and correction section 415.

Threshold setting section 414 sets a threshold determined by the modulation scheme and outputs the set threshold to correction section 415.

Correction section 415 multiplies the threshold outputted from threshold setting section 414 by the denominator coefficient obtained by denominator part calculation section 408 and corrects the threshold. Correction section 415 outputs the corrected threshold to demapping section 409.

As described above, in the present embodiment, equalization processing section 405 corrects influences of multipath in the frequency domain based on the coefficient corresponding to the numerator of an equalized value determined according to the channel estimate value and the frequency domain equalization scheme for equalizing the phase and amplitude. Furthermore, denominator part calculation section 408 calculates the denominator (denominator coefficient) of the equalized value and correction section 415 corrects the threshold determined according to the modulation scheme of the received signal using the denominator (denominator coefficient) of the equalized value. Demapping section 409 calculates a likelihood of the received signal through a threshold decision using the corrected threshold. This makes it possible to perform equalization processing on the amplitude and phase using a multiplication operation instead of a division operation and calculate a likelihood of the received signal, and thereby reduce operation resources.

Embodiment 1 to Embodiment 4 have been described so far.

Embodiments 1 to 4 above have described signal processing for correcting a threshold using a denominator part of the channel estimation result when a signal of M-ary modulation with 4 or more values (e.g., 16QAM) is demodulated. As in the case of Embodiments 1 to 4 above, when a signal of M-ary modulation (with 4 or more values) (e.g., 16QAM) is demodulated, input signals to the demapping section may be bit-shifted to prevent the dynamic range for the input signal to the demapping section from increasing. Furthermore, in Embodiments 1 to 4 above, the threshold may be bit-shifted in the reverse direction of the bit shift applied to the input signal to the demapping section to remove influences of this bit shift. This makes it possible to cause the dynamic range for the input signal to the demapping section in Embodiments 1 to 4 to fall within 1.5 times or less compared to a case where a conventional division operation is performed.

A case will be described where the above-described bit shift is applied to Embodiment 1 (FIG. 3) as an example. Embodiment 1 (FIG. 3) provides a section that calculates the number (multiplier) of the power of 2 closest to the output from denominator part calculation section 108 and a section that bit-shifts the input signal to demapping sections 109-1 and 109-3 from stream separation section 105 by an amount corresponding to the multiplier. Furthermore, Embodiment 1 (FIG. 3) also provides a section that bit-shifts the threshold inputted to demapping sections 109-1 and 109-3 from threshold correction section 115 by the same amount corresponding to the multiplier in the reverse direction of the bit shift applied to the input signal to the demapping section. Here, the multiplier is a positive or negative natural number. When the multiplier is positive, the amplitude of the input signal to the demapping section is reduced through a bit shift in the rightward direction. On the other hand, when the multiplier is negative, the amplitude of the input signal to the demapping section is increased through a bit shift in the leftward direction.

In this way, the above-described embodiments prevent the dynamic range from expanding, and can thereby further reduce the circuit scale.

Although the above-described embodiments have described cases using a physical antenna, the present invention is likewise applicable to an antenna port. The antenna port refers to a logical antenna made up of one or a plurality of physical antennas. That is, the antenna port does not necessarily refer to one physical antenna but also refers to an array antenna made up of a plurality of antennas. For example, 3GPP LTE (3rd Generation Partnership Project Long Term Evolution) does not define the number of physical antennas making up an antenna port. 3GPP LTE defines the antenna port as a minimum unit through which a base station can transmit different reference signals. Furthermore, the antenna port may also be defined as a minimum unit by which a weight of a precoding vector is multiplied.

Although a case has been described in the above-described embodiments as an example where the present invention is configured by hardware, the present invention can also be implemented by software through a processor or the like in conjunction with hardware. In this case, the number of software processing cycles can also be reduced, and therefore the present invention is also applicable to a multimode or SDR (Software Defined Radio).

The disclosure of Japanese Patent Application No. 2010-131186, filed on Jun. 8, 2010, including the specification, drawings and abstract is incorporated herein by reference in its entirety.

INDUSTRIAL APPLICABILITY

The MIMO receiving apparatus and receiving method according to the present invention is suitable for use in a receiving apparatus that applies a linear interference canceller or the like.

REFERENCE SIGNS LIST 100, 100A, 200, 300 MIMO receiving apparatus
101-1 to 101-3, 401 receiving antenna
102-1 to 102-3, 402 radio receiving section
103-1 to 103-3, 403 FFT section
104, 404 channel estimation section
105 stream separation section
106 matrix operation section
107, 301, 407 numerator part calculation section
108, 302, 408 denominator part calculation section
109-1 to 109-3, 409 demapping section
110, 303 weighting factor calculation section
1101-1 to 1101-3 addition section
1102-1 to 1102-3, 1103-1 to 1103-3, 2011 multiplier
111-1 to 111-3 weighting operation section
112, 410 deinterleaver
113, 411 Viterbi decoder
114, 412 MCS decision section
115, 413 threshold correction section
116, 414 threshold setting section
117, 415 correction section
201 weighting factor correction section
2012 shift amount setting section
2013-1 to 2013-3 bit shift section
400 SISO receiving apparatus
405 equalization processing section
406 multiplication section

The invention claimed is:

1. A MIMO receiving apparatus comprising:
  a plurality of receiving antennas that receive a spatially multiplexed signal transmitted from a plurality of transmitting antennas;
  an estimation section that estimates a channel matrix between the plurality of transmitting antennas and the plurality of receiving antennas;
  a separation section that separates the spatially multiplexed signal into a plurality of streams based on a submatrix corresponding to a numerator of a stream separation matrix that is determined by the channel matrix and an interference canceller scheme and equalizes a phase and amplitude of the spatially multiplexed signal;
  a calculation section that calculates a denominator of the stream separation matrix;
  a correction section that corrects a threshold determined according to a modulation scheme of the spatially multiplexed signal using the denominator of the stream separation matrix;
  a demapping section that calculates likelihoods of the plurality of streams through a threshold decision using the corrected threshold;
  a weighting factor deriving section that determines a weighting factor proportional to respective signal-to-noise power ratios of the plurality of streams; and
  a weighting section that weights the likelihoods using the weighting factor.

2. The MIMO receiving apparatus according to claim 1, wherein the separation section comprises:
  a submatrix deriving section that derives the submatrix; and
  a matrix operation section that multiplies the spatially multiplexed signal by the submatrix and thereby separates the spatially multiplexed signal into the plurality of streams.

3. The MIMO receiving apparatus according to claim 1, wherein the weighting factor deriving section determines the weighting factor using the submatrix and denominator of the stream separation matrix.

4. The MIMO receiving apparatus according to claim 3, wherein using the power sum of elements for acquiring a p-th (p is an integer) stream of the submatrix or square root of the power sum and a denominator of the stream separation matrix, the weighting factor deriving section determines the weighting factor for a likelihood of a q-th (q is an integer that satisfies q≠p) stream.

5. The MIMO receiving apparatus according to claim 4, further comprising a weighting factor correction section that comprises:
  a bit shift section that bit-shifts the weighting factor and adjusts the magnitude of the weighting factor;
  a multiplication section that multiplies the power sum of elements of the submatrix for acquiring each stream or square root of the power sum and outputs a constant for reduction to a common denominator; and
  a setting section that determines k (k is an integer) corresponding to 1/(2k) closest to the reciprocal of the constant for reduction to a common denominator and outputs the magnitude of k and the sign of k as the amount of bit shift and the bit shift direction in the bit shift section, wherein:
  the weighting section weights the likelihood using the weighting factor adjusted by the bit shift section.

6. The MIMO receiving apparatus according to claim 1, wherein when the number of receiving antennas is greater than the number of transmitting antennas,
  the submatrix deriving section derives a first submatrix corresponding to the numerator of the stream separation matrix and a second submatrix corresponding to the numerator of a pseudo-inverse matrix represented by a product of a Hermitian conjugate matrix of the channel matrix and an inverse matrix of the square matrix, using a square matrix based on a product of the channel matrix and a Hermitian conjugate matrix of the channel matrix,
  the separation section separates the spatially multiplexed signal into a plurality of streams using the first submatrix,
  the calculation section calculates a determinant of the square matrix as a denominator of the stream separation matrix, and
  the weighting deriving section determines respective weighting factors of the plurality of streams using the second submatrix and the denominator of the stream separation matrix.

7. A receiving method for receiving a spatially multiplexed signal transmitted from a plurality of transmitting antennas using a plurality of receiving antennas, comprising:
  estimating a channel matrix between the plurality of transmitting antennas and the plurality of receiving antennas;
  separating the spatially multiplexed signal into a plurality of streams based on a submatrix corresponding to a numerator of a stream separation matrix that is determined according to the channel matrix and an interference canceller scheme and equalizes a phase and amplitude of the spatially multiplexed signal;
  calculating a denominator of the stream separation matrix;

correcting a threshold determined according to a modulation scheme of the spatially multiplexed signal using the denominator of the stream separation matrix;
calculating likelihoods of the plurality of streams through a threshold decision using the corrected threshold;
determining a weighting factor proportional to respective signal-to-noise power ratios of the plurality of streams; and
weighting the likelihood using the weighting factor.

* * * * *